United States Patent [19]

Howe

[11] Patent Number: 4,993,184

[45] Date of Patent: Feb. 19, 1991

[54] HEART SHAPED, FREE STANDING, LIVING HORTICULTURAL PLANTS

[75] Inventor: Gene L. Howe, Miami, Fla.

[73] Assignee: P.W. Chisholm, Inc., Boynton Beach, Fla.

[21] Appl. No.: 565,717

[22] Filed: Aug. 13, 1990

[51] Int. Cl.⁵ .............................................. A01G 17/04
[52] U.S. Cl. ................................................ 47/4; 47/44
[58] Field of Search ....................... 47/4, 42, 43, 44, 46, 47/47

[56] References Cited

PUBLICATIONS

U.S. Commissioner of Patents, Report on Agriculture for year 1854, p. 406, lower figure.

Primary Examiner—David A. Scherbel
Assistant Examiner—Michele A. Van Patten
Attorney, Agent, or Firm—Thomas M. Schmitz

[57] ABSTRACT

A heart-shaped, free standing, living plant comprises at least two living plants, a left plant and a right plant, formed into opposed lobes forming the heart configuration. Each plant comprises a root end, an intermediate trunk section and a foliage end. The root ends are secured together and the intermediate trunk sections form the left lobe and right lobe respectively. The foliage ends extend laterally outwardly from the downwardly depending intermediate trunk sections to form a foliage midsection of the heart-shaped plant. A support means is provided during the initial growing period wherein the heart-shaped plant is permanently formed. Thereafter, the support means can be removed to form a free-standing, unsupported living plant.

21 Claims, 2 Drawing Sheets

HEART SHAPED, FREE STANDING, LIVING HORTICULTURAL PLANTS

This invention pertains to free standing, living horticultural plants particularly formed in the shape of a heart. Plantings are formed into the desired heart shape and tied to a supporting frame until the plants have reached a point of growth where the plants are permanently formed and become free-standing. The heart-shaped plants are permanently formed and can stand alone without the assistance of the supporting frame.

BACKGROUND OF THE INVENTION

Many attempts have been made to train or shape bushes and plants in various forms. Support frames have been utilized to support horticultural growths of ornamental plants. A fixed permanent trellis, for instance, has been widely used for supporting continuous plant growth. Artificial plants have been affixed to pegged mounting frames as shown in U.S. Pat. No. 3,458,384. Others have provided supporting framework to influence the shaping of plants. A topiary shaping frame for example is shown in U.S. Pat. No. 3,992,812 for use as a cutting and trimming guide in shaping vines or climbing plants into artistic form where the framework can be dismantled and removed from a formed plant.

It now has been found that a free standing, living horticultural plant can be grown in the shape of a heart by planting at least two plants and bending the two trunks in the form of opposed lobal configurations to form a permanent growth pattern. The two opposed trunks are tied together while supported by a temporary frame member. The frame can be subsequently removed after the plant trunks have reached a point of growth where the living plants form a permanent shape, become free-standing and continue to maintain growth in the heart-shaped form as conventional plants without the assistance of the support. The trained plants grow foliage which can be trimmed as desired to provide a foliage configuration in conjunction with the growing heart-shaped tree trunks. Accordingly, a major object of the present invention is to form a free-standing, living plant in the shape of a heart by using an artificial support means to hold the trunks in a heart-shaped form during a growing period, using the trunks of two or more plants to form the heart shape, training the foliage across the middle or midsection of the formed heart-shaped plant, and then removing the support to provide a free-standing, permanently formed plant. These and other advantages of this invention will become more apparent by referring to the drawings and the detailed description of the invention.

IN THE DRAWINGS

SUMMARY OF THE INVENTION

Figure 1:
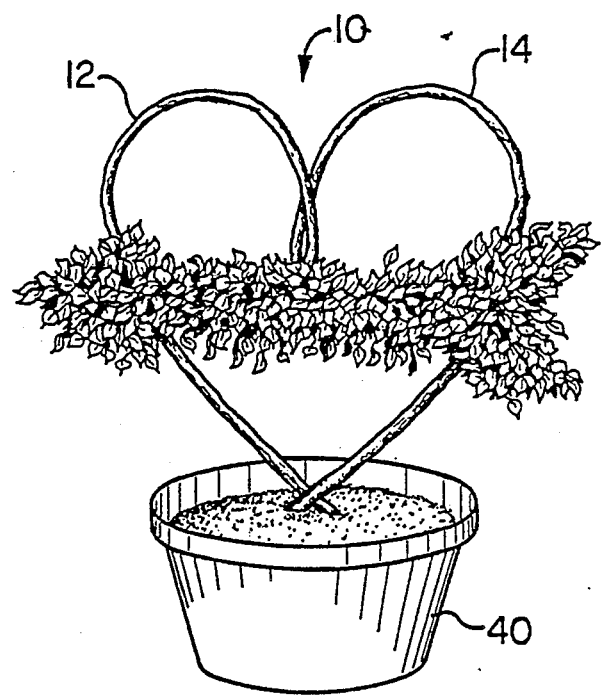
FIG. 1 shows a front elevation view of the free-standing, living heart-shaped plant of this invention planted in a container and showing foliage disposed laterally across the heart-shape horticultural plant.

Briefly, the heart-shaped, free-standing, living plant comprises at least two living plants having root ends secured together, intermediate opposed trunk sections bowed outwardly and each extending into an upper arcuate bend where the opposed trunks extend downwardly together to form a left lobe and right lobe of the heart-shaped plant. The foliage ends are looped downwardly and extended laterally across the mid-section of the formed plant to form a middle foliage section transversing the heart-shaped plant. A support means supports and maintains the heart-shaped configuration during the initial growing period while the growing heart-shaped plant is being permanently formed. Thereafter, the support means can be removed to provide a free-standing living plant.

DETAILED DESCRIPTION OF THE INVENTION

Referring now to the drawings wherein like reference characters indicate like parts, shown is a heart-shaped, free-standing, horticultural plant 10 of this invention.

Figure 3:
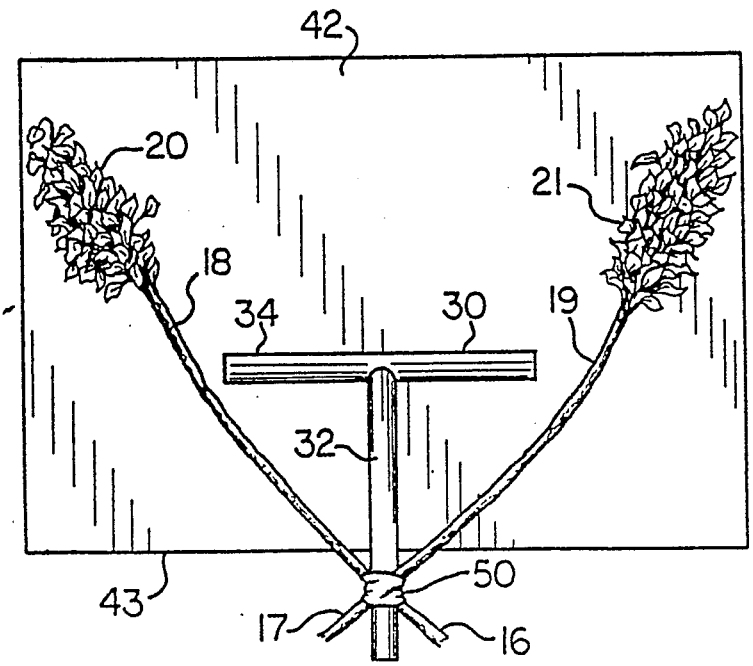
FIG. 3 is a plan view showing a first step in tying two or more living plant trunks to the support frame shown in FIG. 2.

In accordance with this invention, two or more plants 12, 14 are utilized to form the heart-shaped configuration. Each plant 12, 14 is first preferably trimmed of all lateral branches from respective root ends 16, 17 upwardly approximately two-thirds to three-quarters of the upward length of the free standing upright plant 12, 14 to provide foliage ends 20, 21. As shown in FIG. 3, the trimmed plant 12, 14 comprise intermediate trunks 18, 19 having lower root ends 16, 17 and upper foliage ends 20, 21. The trimming distance is not critical and can be between about 60% to 85% of the upright distance with about 70% to 80% preferred depending on whether more or less foliage 20, 21 is desired and whether the heart-shaped plant desired is tall and narrow or short and robust.

The heart-shaped plant 10 is formed in the shape of a heart by using the trunks 18, 19 as a living frame to form the heart-shaped lobes and training the foliage 20, 21 across the middle section of the heart shape. This is accomplished by bending and tying two or more plants 12, 14 comprising a left plant 12 and a right plant 14 to a support means 30 during an initial formation growing period followed by growing and trimming the foliage 20, 21 of each plant 12, 14 until the trunks are strong enough to be self-supporting whereby the supporting member 30 can be removed to provide a free standing, living plant 10. The foliage 20, 21 grows together and can be trimmed to form a full foliage plant or preferably partial foliage across the middle of the plant as shown in FIG. 1.

The type of plants used for forming the heart-shaped plant 10 exhibit pliability or resiliency of the plant trunks 18, 19. Examples of useful plants include *ficus* species (fig tree), *schefflera* species, *hibiscus* species, *ziongerber* species (ginger), *bucida* species (black olive), and similar horticultural plants. The length of the plant is determined by the overall size and configuration of the desired finished heart-shaped plant 10 while still maintaining the necessary resiliency in the plant trunks or stems 18, 19. For example, a 24-inch high heart-shaped configuration ordinarily will require each plant to have at least about 46 inches of trunk length with normal pliability to be sufficiently resilient enough in the bending formation to form a complete half-heart lobe shape and form the desired heart-shaped configuration without breaking or otherwise damaging the intermediate trunks 18, 19. Each plant 12, 14 should be trimmed of all lateral branches starting at the base or root end 16, 17 of the plant 12, 14 up to the desired height thereby leaving about one-fourth or more of each plant 12, 14 in foliage 20, 21.

Figure 2:
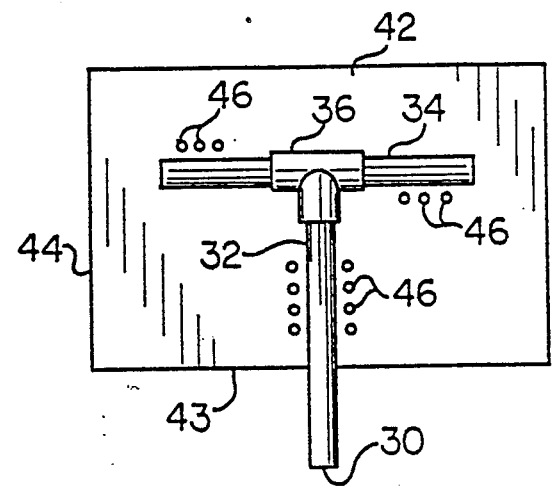
FIG. 2 is a plan view of a temporary support frame disposed on a horizontal work surface for supporting the heart-shaped trunks shown in FIG. 1 during the plant tying stage.

The support 30 preferably is generally T-shaped comprising a vertical member 32 and a horizontal member 34 secured together by a connector 36. As shown in FIG. 2, the support means 30 can comprise one-half inch PVC pipe using two short pieces as the horizontal member 34 interconnected together with the longer vertical member 32 by a T-connector 36. Ordinarily the horizontal member 34 exceeds the length of the vertical member 32 although the length relationships can be varied depending on the depth of planting the roots 16, 17 and the type of plant 12, 14 being used as well as the overall configuration of the heart-shaped plant desired in respect to being robust or narrowed in width. In a blossoming plant, for instance, more space may be required in the center of the growing of the heart configuration to enable the respective foliage 20, 21 holding the blossoms to have enough room to grow unobstructed and flower well without interference from the heart-shaped intermediate trunks 18, 19. When the vertical member 32 is inserted into a growing pot 40 for the growing and training period, the supporting means 30 maintains the growing plant 10 in an upright position in addition to maintaining the plants 12, 14 in a permanent heart-shaped configuration. The vertical post 32 can be lengthened with an additional extension member or shortened to accommodate the depth of the growing pot 40. As a generalization, the height of the vertical post should be about two-thirds of the overall height of the plant 10 to form a desirable heart-shaped plant 10. However, this relative dimension can be adjusted upwardly or downwardly if tall narrowed plants or shorter more robust heart-shaped plants 10 are desired.

In forming the heart-shaped configuration, two or more plants 12, 14 are formed into a heart-shape and attached to the support means 30. As shown in FIG. 2, the support 30 is laid down on a flat horizontal working surface 42 with the vertical base member 32 extending over the lower lateral edge 43 of the horizontal surface 42. The desired length of this extension overhang ordinarily is determined by the depth of the planting pot 40 being used. The length of the overhang should be about the same or less than the pot depth inside so that the roots are located within the soil. For instance, a four inch overhang extension of vertical member 32 is ordinarily used for a four inch planting pot 40. The flat surface 42 can comprise a jig such as a pegboard 44 to stabilize and hold the T-shaped support 30 in place by locating a plurality of upright pegs 46 around the outer periphery of the T-shaped support 30 whereby the support 30 can be held steady during the forming and tying of the plants 12, 14 to the support 30.

As viewed in FIG. 3, the plants 12, 14 can be laid across the support 30 with the root ends 16, 17 crossed just below the lower edge 43 of the flat horizontal surface work 42 with the foliage ends 20, 21 laterally spaced and extending upwardly. Thus, the plants 12, 14 can rest on the horizontal work surface 42 while the lower root ends 18, 19 of the respective trunks 18, 19 are secured together with a root tie means 50 in conjunction with the depending lower section of the vertical member 32 of the support 30. By placing the plants 12, 14 on a horizontal work surface 42 while tying the root ends 16, 17 of the plants 12, 14 enables the root tie connection 50 to be tied sufficiently tight with the vertical member 32 in order to retain the root sections 16, 17 securely in place when pressure is applied during subsequent forming and binding of the upper trunks 18, 19. A strong wide tape, for example, can be used as the root tie means 50 and wrapped several times around both root sections 16, 17 in conjunction with the depending section of the vertical member 32. Although the root sections 16, 17 of the trunks 18, 19 are securely tied to the depending end of the vertical member 32, the root tie 50 is secured in such a manner as to permit the vertical members 32 taped section to be cut and removed after the plants 12, 14 have grown permanently into the heart-shaped plant 10.

Figure 4:
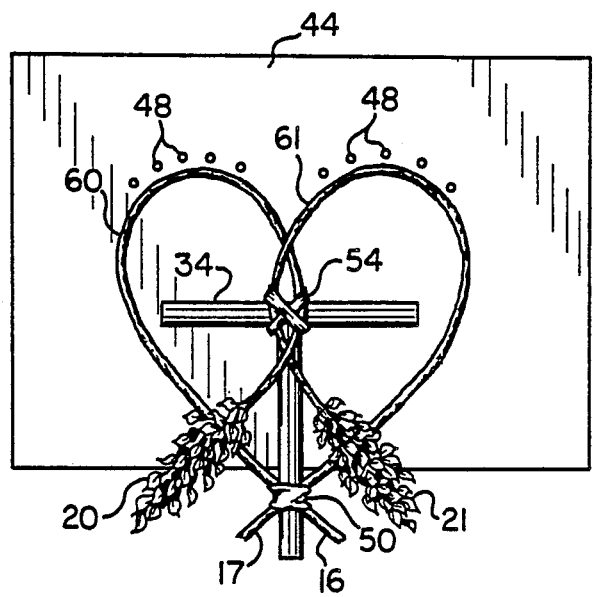
FIG. 4 is a plan view of a second step for forming plant trunks in accordance with this invention.
Figure 6:
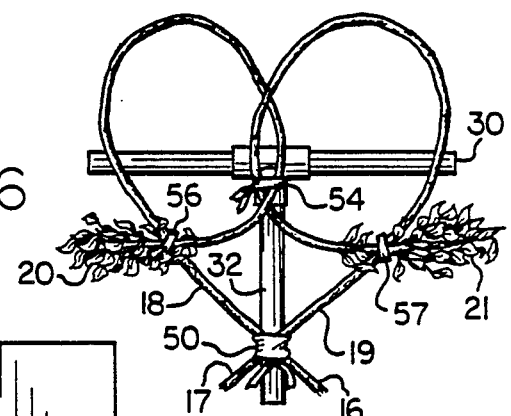

After the root sections 16, 17 are secured, the upwardly extending trunks 18, 19 are bent in outwardly formed, opposed arcuate sections disposed upwardly from the root sections 16, 17 where the arcuately formed intermediate trunks 18, 19 form the upper lobes 60, 61 of the heart-shaped plant 10, as viewed in FIG. 4. The opposed trunks 18, 19 forming the upper lobes 60, 61 extend upwardly beyond the horizontal member 34 of support 30 and then depend downwardly to meet in the center of the heart approximately or just above the T-connector 36. The downwardly depending trunks 18, 19 preferably are securely tied together in a criss-cross fashion in conjunction with the uppermost section of the vertical member 32, such as the T-connector 36 of the support 30. The crossed upper trunks 18, 19 are securely tied together by a trunk tie 54 around the support vertical member 32 in such a fashion as to permit subsequent upward movement of the vertical member 32 to remove the support 30 after the heart-shaped plant 10 is permanently formed. Tying the crossed trunks 18, 19 just below the horizontal T connection 36 prevents upward movement of the bent trunks 18, 19 while maintaining crossed trunks 18, 19 centered in respect to the heart shape formation. Similar non-adhesive wide tying tape can be used to form the trunk tie connection 54 to the T-connector 36. A piece of narrow staking material 71 can be located within the hollow PVC pipe horizontal member 34, if desired, to laterally extend the lateral dimension of the horizontal member 34, such as in FIG. 4. Use of a staking material 71 in conjunction with the horizontal member 34 permits plants 12, 14 to stabilize in the event of a pull forward or back. The staking material maintains alignment between plants 12, 14. The horizontal member 34 provides lateral support to the arcuately formed trunks 18, 19 and prevents twisting of the trunks 18, 19. In preferred aspects of the invention where a peg board 44 is used, a plurality of upper pegs 48 can be located vertically above the horizontal member 34 at a sufficient vertical distance to facilitate formation of the opposed lobes 60, 61 to hold the upper arcuate bends of intermediate trunks 18, 19 in place while fixing the trunk tie 54 to the downwardly depending crossed intermediate trunks 18, 19. Use of the upper pegs 48 facilitates proper symmetrical formation of the upper arcuate trunk bends forming the heart lobes 60, 61 to insure that the heart-shaped plant 10 is properly formed symmetrically.

Figure 5:
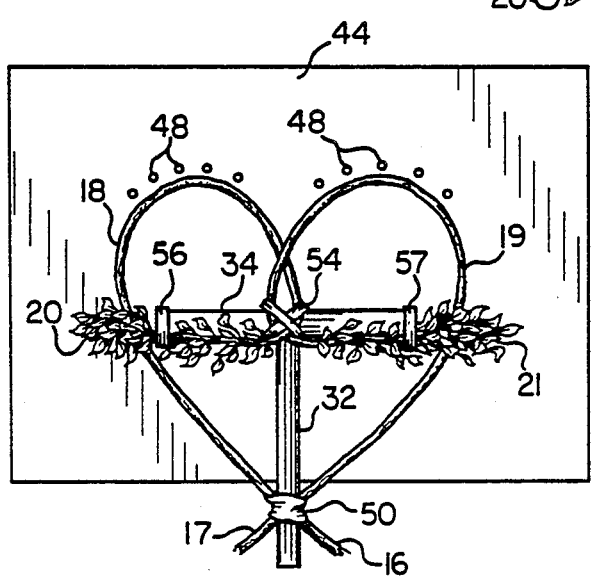
FIG. 5 is a front elevation view of the completely formed heart-shaped plant tied to a support for planting within the growing container as shown in FIG. 1.

To complete the heart formation, the foliage ends 20, 21 of the crossed intermediate trunks 18, 19 are each extended laterally outwardly in a generally horizontal direction where the foliage 20, 21 of each plant 12, 14 crosses its own respective trunk 18, 19 at midsection of the heart formation as shown in FIG. 5. Each foliage section 20, 21 can be tied to its respective trunk 18, 19, such as shown in FIG. 5, where foliage 20 is tied by a foliage tie 56 to its trunk 18 while foliage 21 is tied by foliage tie 57 to its trunk 19. Preferably, the foliage 20, 21 is each tied laterally midway through the foliage section 20, 21 by foliage ties 56, 57 whereby foliage extends laterally outwardly of the respective arcuately formed trunks 18, 19 as well as laterally inwardly to provide a somewhat continuous foliage pattern across the vertical midsection of the heart-shaped plant 10. The foliage can grow together laterally as well as extend upwardly with the continuing growth pattern of the foliage 20, 21, but can be trimmed as desired. In order to form and maintain attractiveness of the foliage growth in conjunction with the heart-shape growth of the trunks, the distal ends of the laterally directed foliage 20, 21 extending laterally outwardly of respective trunks 18, 19 ordinarily are trimmed to provide an approximate two inch extension of foliage 18, 19, more or less, beyond the outer periphery of the heart configuration formed by the arcuately formed plant trunks 18, 19. The foliage ties 56, 57 securing the foliage 20, 21 to its respective trunk 18, 19 can comprise tying tape securely wrapped around foliage 20, 21 and its respective trunk 18, 19.

The heart-shaped plant 10 formed on the horizontal work surface 42 and/or pegboard 44 can be removed and planted along with support 30 in growing soil contained within a growing container or planted in ordinary nursery open planting ground. The root ends 16, 17 are placed into the growing medium where the roots are buried in the ground in conjunction with the vertical member 32 of the support 30. For example, the vertical post 32 and roots 16, 17 can be buried about four inches into the ground for a four inch growing pot 40 while the root tie connector 50 is maintained approximately at ground level. The supported heart-shaped plant 10 is grown for time sufficient depending on the plant type of plants 12, 14 with conventional watering, fertilizing and sunlight required to promote growth until the intermediate trunks 18, 19 have permanently grown rigid into their unnatural heart shape configuration. Ordinarily, this will take 4 to 5 months depending on the plant. During the growing stage, the foliage 20, 21 grows laterally together across the midsection of the heart-shaped plant 10, as shown in FIG. 1. The foliage 20, 21 can be trimmed or not trimmed as desired.

After the growing heart-shaped plant 10 has been permanently formed, the support 30 can then be easily removed by slipping the vertical member 32 upwardly through the root ties 50 and the trunk tie 54 after the ties 50 and 54 have been cut and removed. If desired, either or both ties 50, 54 can be replaced to keep plants 12, 14 secured. Upon removing the support 30, the heart-shaped plant 10 is free standing with permanently formed intermediate trunks 18, 19 forming the desired heart shape. The free standing plant 10 does not require external support means for maintaining continuous growth in the heart-shaped pattern. In preferred aspects of this invention, the foliage 20, 21 can be trimmed and formed into a "pierced arrow" configuration to provide a heart-shaped plant 10 with the "arrow" piercing the center of the heart-shaped plant 10 as shown in FIG. 1.

ILLUSTRATIVE EXAMPLE

The following is an illustrative example for forming two plants into a single heart-shaped plant in accordance with this invention.

A T-shaped support 30 was fabricated from schedule 40 PVC plastic pipe. The height of the support frame 30 was about two-thirds of the height of the intended heart-shaped plant 10. The vertical member 32 was 16 inches in height and the horizontal member 34 was 16 inches in width. The growing pot 40 containing growing soil was about four inches in depth. The overall size of the heart-shaped plant 10 in the growing pot 40 was about 24 inches in height at its highest point and about 20 inches in width across its widest area. Two ficus benjamina (fig tree) plants 12, 14 were used to form the heart-shaped plant 10. Each plant was at least 46 inches in normal length (unbended height). Each plant 12, 14 was trimmed of foliage on the lower two-thirds portion of the trunk 18, 19 to provide a trimmed lower trunk section of about 36 inches from the root end 16, 17. Each plant 12, 14 was crossed at the roots 16, 17 and tied by root tie 50 as previously described with the foliage ends 20, 21 extending upwardly and spaced lateral apart. The roots 16, 17 were tied about six inches above the lower distal end of the vertical member 32 by wrapping the trunks 18, 19 three times just above the roots 16, 17 and securing the same to the vertical member 32. Each trunk 18, 19 was looped above the horizontal member 34 of the support 30 to form arcuate lobes 60, 61 as previously described. The uppermost height of each lobe 60, 61 was vertically spaced about 8 inches above the horizontal member 34 of the support 30. The downwardly depending trunks were criss-crossed and secured with tape 54 just below the horizontal member 34. The foliage ends 20, 21 were each laterally directed outwardly and individually tied at 56, 57 to their respective trunks 18, 19 as previously described, at a vertical distance about six inches below the horizontal member 34. The distal foliage ends 20, 21 were trimmed to provide about two inch extensions beyond the outer periphery of the heart shape formed by the arcuately formed intermediate trunks 18, 19. The preformed heart-shaped plant 10 attached to support 30 was then planted in a four inch deep growing pot whereby the root tie 50 was located about two inches above the ground level. The planted heart-shaped plant 10 was then grown for about 5 months with adequate watering, fertilizing, and sunlight to produce a permanently formed heart-shaped growing plant 10. The support 30 was removed and the resulting plant 10 was a free standing, unsupported, permanently heart-shaped plant 10 of about 24 inches high at its highest point.

Although the heart-shaped plant of this invention has been described in specific detail the scope of the invention is not intended to be limited except as set forth in the appended claims.

I claim:

1. A free-standing, growing, horticultural plant formed into a heart-shaped plant, comprising:

at least two living plants providing a left plant and a right plant, each plant having a lower root end, an intermediate trunk section, and a foliage end, the root ends of each plant secured together and disposed in ground, each intermediate trunk extending upwardly and bowed outwardly forming an upper arcuate bend, each intermediate trunk further extending downwardly and inwardly to form lobe configurations of the heart-shaped plant where the left plant forms the left lobe and the right plant forms the right lobe, where the left and right trunks meet at an internal midsection of the heart-shaped plant, the foliage end of each plant directed laterally outwardly and disposed between the upper lobes and the lower roots of the heart-shaped plant to form a lateral foliage area.

2. The horticultural heart-shaped plant of claim 1 where the root ends are crossed.

3. The horticultural heart-shaped plant of claim 2 where the root ends are crossed and tied.

4. The horticultural heart-shaped plant of claim 1 where the intermediate trunks are secured together where the downwardly depending left trunk meets the right trunk at an internal midsection of the heart-shaped plant.

5. The horticultural heart-shaped plant of claim 1 where the laterally disposed foliage of the left plant is secured to the outwardly bowed trunk section of the left plant and the laterally disposed foliage of the right plant is secured to the outwardly bowed trunk section of the right plant.

6. The heart-shaped plant of claim 5 where the laterally disposed foliage is located in a midsection of the heart-shaped plant located at a vertical distance of about two-thirds of the vertical height of the heart-shaped plant.

7. The heart-shaped plant of claim 6 where the foliage extends laterally beyond the outwardly bowed left and right trunks forming the left and right lobes.

8. The horticultural heart-shaped plant of claim 1 where the foliage of the left plant and the foliage of the right plant forms a continuous lateral foliage at a vertical midsection of the heart-shaped plant.

9. The horticultural heart-shaped plant of claim 1 where the lateral foliage of the left plant and lateral foliage of the right plant are trimmed in the shape of an arrow traversing the heart-shaped plant.

10. The horticultural heart-shaped plant of claim 9 where the lateral foliages comprise continuous lateral foliage.

11. The horticultural heart-shaped plant of claim 1 disposed in and growing within a growing container.

12. The horticultural heart-shaped plant of claim 1 where the left plant is a specie plant different than the specie of the right plant.

13. The heart-shaped plant of claim 1 where the plants are assembled and supported by an exterior support means during an initial growing period to form a permanent heart-shaped plant and the support is removed after the initial growing period.

14. The heart-shaped plant of claim 1 where the intermediate trunk section of the left plant and the right plant are trimmed of foliage.

15. A method of growing a free-standing, heart-shaped horticultural plant comprising:
providing a support means for supporting the heart-shaped plant during the initial growing period;
providing at least two living plants comprising a left plant and right plant, each plant having a lower root end, an intermediate trunk section, and a foliage end;
securing the root ends of the left plant and the right plant together while securing said root ends to the support means;
bowing each intermediate trunk section outwardly and forming an upper left arcuate bend and an upper right arcuate bend, forming extending each said intermediate trunk sections downwardly and inwardly and further securing to said support means where both said intermediate trunk sections meet internally in a midsection of the heart-shaped plant to form lobe configurations where the left plant forms the left lobe and the right plant forms a right lobe;
directing the foliage end of each plant laterally outwardly where the foliage of the left plant is directed left and secured to the outwardly bowed left trunk section and the foliage of the right trunk is directed right and is secured to the outwardly bowed right trunk section to form a midsection lateral foliage area of the heart-shaped plant; and
inserting the roots and lowermost end of the support in growing soil.

16. The method of claim 15 where the support means comprises a T-shaped support having a vertical member for insertion into a growing soil and an upper horizontal member.

17. The method of claim 16 where the work surface comprises a pegboard containing a plurality of pegs adapted to maintain the support means secure and prevent free movement of the support means.

18. The method of claim 17 where the pegboard includes a plurality of pegs for engaging and maintaining in place the uppermost arcuate sections of each lobe.

19. The method of claim 16 where the horizontal member contains an extender for engaging the outwardly bowed intermediate trunk sections to prevent movement of said intermediate trunk sections.

20. The method of claim 15 where a working surface is provided for supporting the supporting means, where said working surface includes a lower edge, and the root ends overhang and extend beyond the lower edge of the work surface and are secured to the lower end of the vertical member of the support.

21. A method of growing a free-standing, heart-shaped horticultural plant comprising:
providing a support means for supporting the heart-shaped plant during the initial growing period;
providing at least two living plants comprising a left plant and right plant, each plant having a lower root end, an intermediate trunk section, and a foliage end;
securing the root ends of the left plant and the right plant together while securing said root ends to the support means;
bowing each intermediate trunk section outwardly and forming an upper left arcuate bend and an upper right arcuate bend, further extending each said intermediate trunk sections downwardly and inwardly and further securing to said support means where both said intermediate trunk sections meet internally in a midsection of the heart-shaped plant to form lobe configurations where the left plant forms the left lobe and the right plant forms a right lobe;
directing the foliage end of each plant laterally outwardly and securing the left foliage and the right foliage to the horizontal member of the support means;
inserting the roots and lowermost end of the support in growing soil.

* * * * *